(12) United States Patent
Thomas et al.

(10) Patent No.: US 8,086,819 B2
(45) Date of Patent: Dec. 27, 2011

(54) SOLID STATE DRIVE OPTIMIZER

(75) Inventors: Basil Thomas, Sylmar, CA (US); Craig Jensen, La Cañada, CA (US); Andrew Staffer, Sylmar, CA (US); Santhosh Ramankutty, Stevenson Ranch, CA (US)

(73) Assignee: Diskeeper Corporation, Burbank, CA (US)

( * ) Notice: Subject to any disclaimer, the term of this patent is extended or adjusted under 35 U.S.C. 154(b) by 539 days.

(21) Appl. No.: 12/244,771

(22) Filed: Oct. 3, 2008

(65) Prior Publication Data

US 2009/0094433 A1 Apr. 9, 2009

Related U.S. Application Data

(60) Provisional application No. 60/978,086, filed on Oct. 5, 2007.

(51) Int. Cl.
*G06F 13/00* (2006.01)
(52) U.S. Cl. .................. 711/172; 711/E12.078
(58) Field of Classification Search .................. None
See application file for complete search history.

(56) References Cited

U.S. PATENT DOCUMENTS

| | | | |
|---|---|---|---|
| 5,675,790 A * | 10/1997 | Walls | 1/1 |
| 6,226,728 B1 * | 5/2001 | See et al. | 711/171 |
| 6,330,583 B1 | 12/2001 | Reiffin | |
| 6,591,287 B1 | 7/2003 | More et al. | |
| 7,076,781 B2 | 7/2006 | Skovira | |
| 7,451,704 B1 * | 11/2008 | Gold et al. | 102/495 |
| 2001/0010065 A1 * | 7/2001 | Chiba | 711/103 |
| 2001/0032293 A1 * | 10/2001 | Korst et al. | 711/112 |
| 2003/0231630 A1 * | 12/2003 | Messenger | 370/392 |
| 2005/0073508 A1 * | 4/2005 | Pittel et al. | 345/175 |
| 2005/0240934 A1 | 10/2005 | Patterson et al. | |
| 2007/0143759 A1 | 6/2007 | Ozgur et al. | |
| 2008/0005524 A1 * | 1/2008 | Worrall | 711/171 |

OTHER PUBLICATIONS

EPO office action for foreign patent application No. 07 777 432.1-2211, dated Oct. 28, 2009, 4 pages.
EPO office action for foreign patent application No. 07 777 320.8-2211, dated Oct. 28, 2009, 3 pages.

* cited by examiner

*Primary Examiner* — Hetul Patel
*Assistant Examiner* — Sean D Rossiter
(74) *Attorney, Agent, or Firm* — Varun A. Shah; Hickman Palermo Truong & Becker LLP (57) ABSTRACT

A method for optimizing a solid state drive is described. The method involves determining whether a free space fragment on the SSD is smaller than the threshold fragment size. If the free space fragment on the SSD is smaller than the threshold fragment size, eliminating the free space fragment. If the free space fragment on the SSD is not smaller than the threshold fragment size, retaining the free space fragment for storing data. Elimination of the free space fragments smaller than the threshold fragment size results in a fewer number of free space fragments being used when writing to the SSD, allowing for improved SSD performance.

24 Claims, 3 Drawing Sheets

SOLID STATE DRIVE OPTIMIZER

CLAIM OF PRIORITY

This application claims priority under 35 U.S.C. §119 to the provisional application Ser. No. 60/978,086 filed on Oct. 5, 2007.

INCORPORATION BY REFERENCE

This application hereby incorporates by reference, application Ser. No. 11/546,072 filed on Oct. 10, 2006, application Ser. No. 11/546,514 filed on Oct. 10, 2006, and application Ser. No. 11/471,466 filed on Jun. 19, 2006.

FIELD OF THE INVENTION

The present invention relates to solid state drives in general. More specifically, the invention relates to optimizing solid state drives.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A solid state drive (SSD), which may also be referred to as a solid state disk, is a storage device that stores data using volatile or non-volatile solid-state memory. Solid-state memory is composed of electronic components that are based on semiconductors. Solid state drives may include different types of memory elements including, but not limited to, Static Random Access Memory (SRAM), Dynamic Random Access Memory (DRAM), Parameter Random Access Memory (PRAM), FLASH memory (e.g., NOR FLASH memory, and NAND FLASH memory), or Phase Change Memory (PCM).

Since SSDs do not have any moving parts, SSDs offer significantly reduced risk of mechanical failures. Fewer mechanical failures results in improved system reliability. Furthermore, due to the lack of moving parts, SSDs provide lower read and write seek times as compared to standard rotating-medium hard-drives. Accordingly SSDs allow for higher sequential and random data read and write rates.

Although there are no moving parts on an SSD, there are nonetheless performance issues as a result of device limitations and possibly free space fragments. For example, a performance-based limitation may be the limited number of write operations a SSD can perform in any given time period. When a SSD is writing to a multitude of small free space fragments, a file must be fragmented into many different pieces for storage onto the SSD. As writing to each free space fragment may require an erase operation and requires a write operation and the number of write operations a SSD can perform can be limited, a multitude of small free space fragments may result in a failure to utilize the maximum sequential write speed of the SSD due to the limited number of write operations.

In normal computer usage, modern operating systems such as Windows™ (Windows™ is a trademark of the Microsoft Corporation, Seattle, Wash.) create a multitude of free space fragments. For example, browsing the Internet could potentially create lots of unwanted free-space fragments. The web browser creates many temporary files as it is used. Most of the temporary files are small and have a short life time and are deleted frequently, e.g., during browser cache cleanup, etc. However, all the temporary files are not deleted at the same time or in the order in which they were created. This phenomenon accelerates the creation of the free-space fragments.

Furthermore, when a newly-created file is being stored to disk, file systems generally begin writing the newly-created file into either (a) the most recently freed free-space fragment or (b) the first-identified free-space fragment without considering the size of the free space fragment. If the file to be written is large and the identified free-space fragments are small, the file is split into many fragments corresponding to the identified free-space fragments and multiple write operations are required to store the file to the disk. In addition to the write operations required to store the actual file, multiple write operations may also be required to update the file system structures when the file is stored in multiple fragments.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Several features are described hereafter that can each be used independently of one another or with any combination of the other features. However, any individual feature might not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in the specification.

Overview

A method for optimizing a solid state drive (SSD) is provided. Writing a file to a SSD may require multiple erase and write operations if the free space fragments being written to are too small for the entire file. For example, if each free space fragment on the SSD that a file is being written to is much smaller than the size of the file, then the file may be split into a multitude of fragments and a write operation may be required for each free space fragment until the entire file is written to the SSD. Accordingly, the present invention optimizes the SSD by eliminating small free space fragments by filling the free space fragments with data or by making the free space fragments bigger so that it does not affect the write performance. This causes the operating system to write files sequentially or at least in fewer free space fragments that gives the best write performance.

In accordance with an embodiment, a threshold fragment size is used as the basis for determining whether to eliminate free space fragments or retain free space fragments on the SSD for data storage. The size of the free space fragments is compared to the threshold fragment size. If the free space fragments are smaller than the threshold fragment size, the free space fragments are eliminated so that the SSD does not use the free space fragments to write fragments of a file. If the free space fragments are at least as large as the threshold fragment size, the free space fragments are retained for data storage by the SSD. Eliminating free space fragments smaller than the threshold fragment size results in the file being written into a larger free space fragment(s) and accordingly requires a fewer number of free space fragments for writing a file and a fewer number of write operations. By reducing the number of write operations per period of time to less than or equal to the number of write operations that can actually be performed by the SSD, the performance of the SSD is improved. The improved performance of the SSD is not limited by the number of write operations that can be performed since the number of write operations needed for an optimized SSD are less than the number of write operations that can be performed. In an embodiment, the threshold fragment size is determined based at least on the sequential write speed of the SSD and the number of input/output (I/O) operations allowed per period of time on the SSD. For example, the threshold fragment size may be determined at least in part by dividing the sequential write speed of the SSD by the I/O per second of the SSD.

In an embodiment, several different threshold fragment sizes may be tested when writing files and a threshold fragment size that corresponds to the optimal performance may be used. Optimization of the threshold fragment size may be performed periodically or based on a predetermined condition, e.g., occurrence of a low performance level by the SSD or a predetermined number of free space fragments.

Although specific components are recited herein as performing the method steps, in other embodiments agents or mechanisms acting on behalf of the specified components may perform the method steps. Further, although the invention is discussed with respect to components on a single system, the invention may be implemented with components distributed over multiple systems. In addition, although the invention is discussed with respect to a solid state drive (SSD), embodiments of the invention can be applicable to any memory drive (e.g., a rotating disk drive).

Embodiments of the invention also include any system that includes the means for performing the method steps described herein. Embodiments of the invention also include a computer readable medium with instructions, which when executed, cause the method steps described herein to be performed.

Free Space Fragment Elimination

Free space fragments referred in a file system level are blocks of memory or storage area that are not referenced as containing data and are available for allocation. Free space fragments may be generated when an object stored in memory is deleted by, for example, removing the reference to the memory space. As objects may not be deleted in the same order they are created, free space fragments corresponding to deleted objects are created between blocks of memory where data is stored and referenced. Writing to each free space fragment may require an erase operation and requires a write operation. Accordingly, if free space fragments are too small to hold a file, a file has to be fragmented and written into many different free space fragments. The smaller the free space fragments, the greater the fragmentation required to write a file. As the number of write operations that a drive can perform per period of time is limited, a multitude of small free space fragments may require a high level of file fragmentation and prevent the utilization of maximum sequential write speed of the drive. Accordingly, in an embodiment of the invention, free space fragments that are smaller than a specified threshold fragment size are eliminated. The elimination of these free space fragments reduces the number of free space fragments that are written to by the file system.

Eliminating a free space fragment may involve filling the free space fragment with at least a portion of another file. For example, files toward the end of the disk, a rarely used file, or temporary filler files may be used to fill the free space fragment. Filling the free space fragment by storing at least a portion of another file eliminates the free space fragments which can potentially affect the SSD performance. Eliminating a free space fragment may also involve merging the free space fragment with one or more adjacent free space fragments such that the merged free space fragment is at least as large as the threshold fragment size. In an embodiment, a free space fragment is eliminated after a resource required to eliminate the free space fragment complies with an idleness criteria. For example, if a utilization of the resource is below a predetermined percentage, the idleness criteria may be met. In another example, the idleness criteria may involve a frequency of resource usage where a predetermined low frequency of usage meets the idleness criteria. A more detailed description of an idleness criteria and resource based scheduling is described in patent application Ser. No. 11/546,514 filed on Oct. 10, 2006, which is incorporated by reference.

System Architecture

Although a specific computer architecture is described herein, other embodiments of the invention are applicable to any architecture that can be used to optimize a solid state drive (SSD), based on a threshold fragment size.

Figure 1:
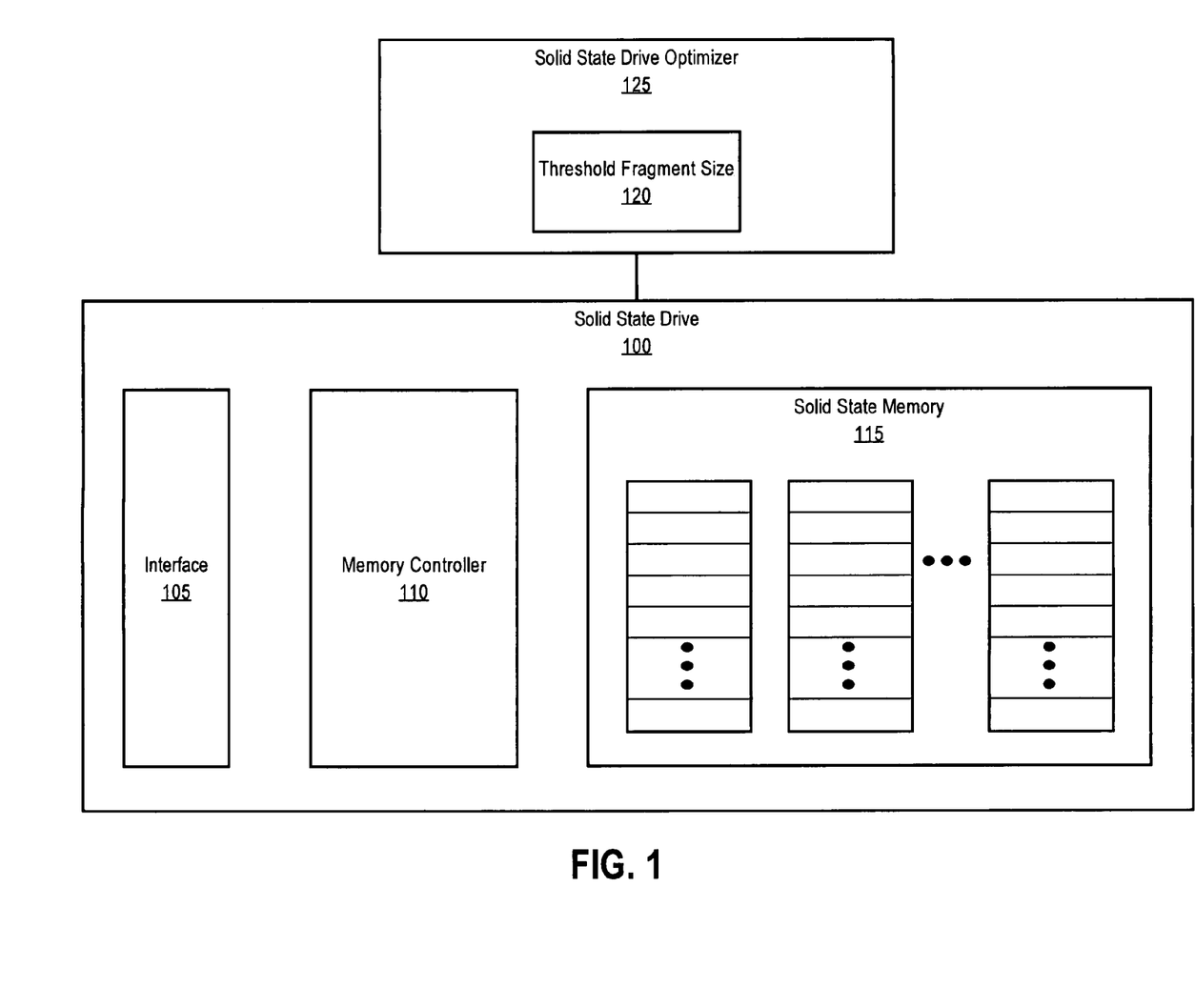
FIG. 1 is a block diagram illustrating a solid state drive and a solid state drive optimizer in accordance with an embodiment.

FIG. 1 shows a SSD (100) and a SSD optimizer (125) in accordance with one or more embodiments of the invention. As shown in FIG. 1, the SSD (100) includes an interface (105), a memory controller (110), and a solid state memory (115).

The Interface

The interface (105) generally represents any connection that can be used to exchange data (e.g., store data or retrieve data) with the SSD (100). For example, the interface (105) may be a connection between the SSD (100) and a motherboard for data transfer. The interface (105) may carry data words in parallel or in bit-serial form. Examples of the interface (105) include, but are not limited to, Advanced Technology Attachment (ATA) (e.g., Serial Advanced Technology Attachment (SATA) and Parallel Advanced Technology Attachment (PATA)) or Intelligent Drive Electronics (IDE) or Small Computer System Interface (SCSI). The interface (105) may allow an external component to directly access the solid state memory (115) or indirectly access the solid state memory (115) via commands using the memory controller (110).

The Memory Controller

In one or more embodiments, the memory controller (110) generally represents a component which includes logic to manage the flow of data going to and from the solid state memory (115). Although the memory controller (110) is shown as residing on the SSD (110) itself, the memory controller (110) may reside on another component in accordance with an embodiment. The memory controller (110) may be connected to the solid state memory (115) via a set of multiplexers and demultiplexers or a predefined protocol (ATA) in order to reduce the number of wires and or complexity needed to connect the memory controller (110) to the solid state memory (115).

In an embodiment, the memory controller (110) may have control of where data is stored on the solid state memory (115). For example, the memory controller (110) may include logic to determine which portions of the solid state memory (115) are available for data storage, and which portions of the solid state memory (115) are not available for data storage.

The memory controller (110) may receive commands to write, retrieve, or delete blocks of data from one or more applications through the file system that are executing on a device connected to the SSD. The memory controller (110) may also receive commands from the solid state drive optimizer (125) through file system or operating system, shown as connected to the SSD (100).

The Solid State Memory

In one or more embodiments, the solid state memory (115) generally represents a data storage component that includes logic to retain digital data. The solid state memory (115) includes semiconductor devices that include logic and hardware to retain digital data. For example, the solid state memory (115) may store bits in phase changing RAM, single level cells (SLC) or multi-level cells (MLC). The threshold fragment size (120), described above, may be computed differently based on whether the bits are being stored in SLCs or MLCs within the solid state memory (115). Furthermore, the threshold fragment size (120) may also be computed differently based on the number of levels in multi-level cells. The solid state memory (115) may be implemented as Static Random Access Memory (SRAM), Dynamic Random Access Memory (DRAM), Parameter Random Access Memory (PRAM), FLASH memory (e.g., NOR FLASH memory, and NAND FLASH memory), Phase Change Memory (PCM) or another type of suitable memory.

The Solid State Drive Optimizer

In one or more embodiments, the solid state drive optimizer (125) generally represents software and/or hardware used for optimizing the SSD (100) in order to improve SSD performance. For example, the SSD optimizer (125) may correspond to a software application executing on a device connected to the SSD (100). In a computer system, the solid state optimizer (125) may be an application running concurrently with other applications that store data on the SSD (100). In another example, the SSD optimizer (125) may correspond to a device with logic embedded to optimize the SSD (100). Although shown as connected to the SSD (100) in FIG. 1, the SSD optimizer (125) may also correspond to software and/or component on the SSD (100) itself, in accordance with an embodiment of the invention.

The SSD optimizer (125) includes logic to optimize the SSD (100) by eliminating free space fragments that are smaller than the threshold fragment size (120) thus forcing the operating system to write data or files sequentially, as described above. The SSD optimizer (125) may be activated by a user, may be activated periodically, or may be activated based on a predetermined condition(s) (e.g., predetermined fragmentation level of the SSD (100), or a low performance level of the SSD (100)). The SSD optimizer (125) may also be activated by a low resource usage. For example, if resources (e.g., a processor) used by the SSD optimizer (125) in optimizing the SSD (100) have a low current utilization level, the SSD optimizer (125) may be activated. In an embodiment, multiple conditions may be required in combination for activation of the SSD optimizer (125) (e.g., low performance level of the SSD (100) and low current utilization level of a resource).

In an embodiment, the SSD optimizer (125) may include logic to schedule any tasks performed as computer micro-jobs. Computer micro-jobs are described in patent application Ser. No. 11/471,466 filed on Jun. 19, 2006 and patent application Ser. No. 11/546,072 filed on Oct. 10, 2006, which are incorporated by reference. Accordingly, tasks performed by the SSD optimizer (125) to optimize the SSD (100) may be performed over time as different computer micro-jobs.

The Threshold Fragment Size

In one or more embodiments, the threshold fragment size (120), shown as stored on the SSD optimizer (125) corresponds to a particular free space fragment size used by the SSD optimizer (125) in performing the above-described tasks. Specifically, free space fragments that are smaller than the threshold fragment size (120) are eliminated by the SSD optimizer (125) and the free space fragments that are larger than or equal to the threshold fragment size (120) are retained for data storage by the SSD optimizer (125). Use of the threshold fragment size (120) in eliminating free space fragments smaller than the threshold fragment size (120) may force the file system to write a file sequentially in a single free space fragment or multiple free space fragments within the limit of memory write 10 per second (IOPS) of the SSD, which does not affect the SSD performance based on the write 10 per second of the SSD.

Although shown as stored on the SSD optimizer (125), the threshold fragment size (120) may be maintained by any component (e.g., the SSD optimizer (125), the SSD (100), or another suitable device). The threshold fragment size may be maintained by a software application (e.g., the SSD optimizer) as a variable or may be hard wired onto a device. For example, the threshold fragment size may be hardwired onto the SSD (100), the SSD optimizer (125) if the SSD optimizer is implemented as a device, a system executing the SSD optimizer (125) if the SSD optimizer is implemented as a software application running on the system, or another suitable device. The threshold fragment size (120) may also be obtained from a configuration area which can be controlled by a user (120).

In an embodiment, the threshold fragment size (120) is computed by the SSD optimizer (125), the memory controller (110), a user, or by another suitable entity. In an embodiment, the threshold fragment size (120) may be computed based on the sequential write speed or the number of write operations the SSD (100) can perform per period of time. One of the step(s) of computing the threshold fragment size may involve dividing the sequential write speed by the number of write operations that the SSD can perform in a given period of time. For example, if the sequential write speed is 40 MB/second and the number of write operations that can be performed by the SSD (100) is 10/second, then the threshold fragment size is computed by dividing 40 by 10 to equal 4 MB. Accordingly, the threshold fragment size may be set to 4 MB. Furthermore, computing the threshold fragment size may also involve additional calculations (e.g., multiplication by a constant 3 or 4 to result in 12 MB or 16 MB) to account for the differences between actual performance versus theoretical performance or speed.

The threshold fragment size (120) for the SSD may be determined dynamically or may be a static value used by the SSD optimizer (125). For example, a hardwired threshold fragment size (120) may be used permanently for optimizing the SSD (100). Alternatively, each time the SSD (100) is optimized or periodically, the threshold fragment size (120) may be recomputed or obtained.

In an embodiment, different threshold fragment sizes may be used to determine an optimal performance. For example, varying values of the threshold fragment size may be used for optimizing the SSD (100) by eliminating free space fragments on the SSD (100). Thereafter performance may be measured for a period of time subsequent to optimizing the SSD (100). The threshold fragment size that results in the best performance subsequent to optimization may be set as the threshold fragment size (120).

In one embodiment, once a threshold fragment size (120) is set, retesting of the threshold fragments size (120) may be performed periodically. During retesting, a value higher than and a value lower than the threshold fragment size (120) may be temporarily used for optimization of the SSD (100). After using the higher and/or lower threshold fragment size, the subsequent performance of the SSD (100) may be evaluated to determine if the threshold fragment size (120) should be increased, decreased, or retained without modification.

Optimizing the Solid State Drive

Figure 2:
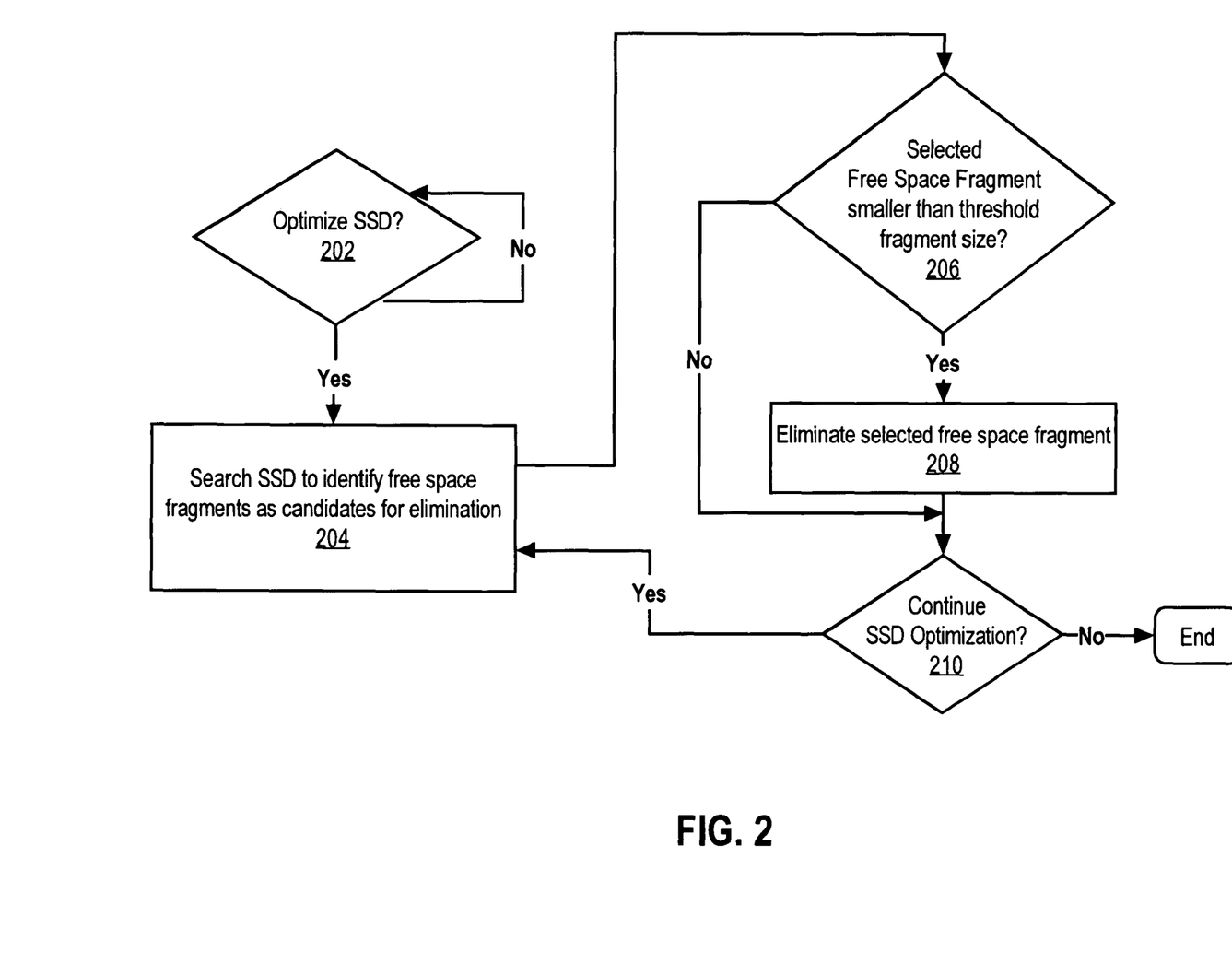
FIG. 2 is a flow diagram illustrating an embodiment for optimizing a solid state drive.

FIG. 2 shows a flowchart for optimizing a solid state drive (SSD) using a threshold fragment size, in accordance with one or more embodiments. One or more of the steps described below may be omitted, repeated, and/or performed in a different order. Accordingly, the specific arrangement of steps shown in FIG. 2 should not be construed as limiting the scope of the invention.

In an embodiment, one or more of the steps described below to optimize the solid state drive may be preceded by resource availability check. The resource availability check may be made to ensure that the resources needed to perform the step are available to meet idleness criteria, as described above. Furthermore, one or more of the steps described below may be scheduled as computer micro-jobs, as described above.

Initially, a decision is made whether to optimize the SSD (Step 202). The decision to optimize the SSD may be based on one or more conditions. For example, the decision to optimize the SSD may be based on an occurrence of low SSD performance, an occurrence of a predetermined level of fragmentation (e.g., a number of free space fragments, number of free space fragments smaller than the threshold fragment size, etc.), a resource availability, a time based scheduler (e.g., periodic optimization), file fragmentation level, or based on any other suitable criteria. SSD Optimizer may also defragment the files if the files get too fragmented, this makes the file access more efficient and reliable.

Next the SSD is searched to identify free space fragments as candidates for elimination (Step 204). Searching the free space may involve searching the file system or operating system APIs or searching for storage addresses that are not referenced by file system or that are indexed as storage blocks locations available for allocation. The file system may be searched in sequential order, order of storage de-allocation, or in any other suitable order. In an embodiment, free space fragments may be identified as candidates for elimination in order from smallest to largest so that the smallest free space fragments may be eliminated first.

Next, a determination is made whether the free space fragment that is identified as a candidate for deletion is smaller than the threshold fragment size (Step 206). If the identified free space fragment is not smaller than the threshold fragment size, then the identified free space fragment is suitable for writing a file and accordingly, the identified free space fragment is retained for writing. However, if the free space fragment is smaller than the threshold fragment size, then the identified free space fragment is not suitable for data storage and accordingly, is eliminated, as described above (Step 208). The identified free space fragment may also be eliminated by merging the free space fragment with one or more adjacent free space fragments to create a merged free space fragment, where the merged free space fragment is at least as large as the threshold fragment size.

Next, a determination may be made whether to continue optimization of the SSD (Step 210). A decision may be made to continue optimization until all of the SSD has been searched for free space fragments smaller than the threshold fragment size. In another example, the SSD may be optimized as long as resources are highly available (e.g., during off-peak hours). The SSD may also be optimized based on a timer where a block of time is devoted to optimizing the SSD.

Although the above steps are described in sequential order for eliminating each free space fragment smaller than the threshold fragment size, embodiments of the invention include any suitable manner of performing the tasks described above. For example, all free space fragments may be identified first as candidates for elimination. Thereafter, each of the identified free space fragments may be compared to the threshold fragment size and eliminated if smaller than the threshold fragment size.

Hardware Overview

Figure 3:
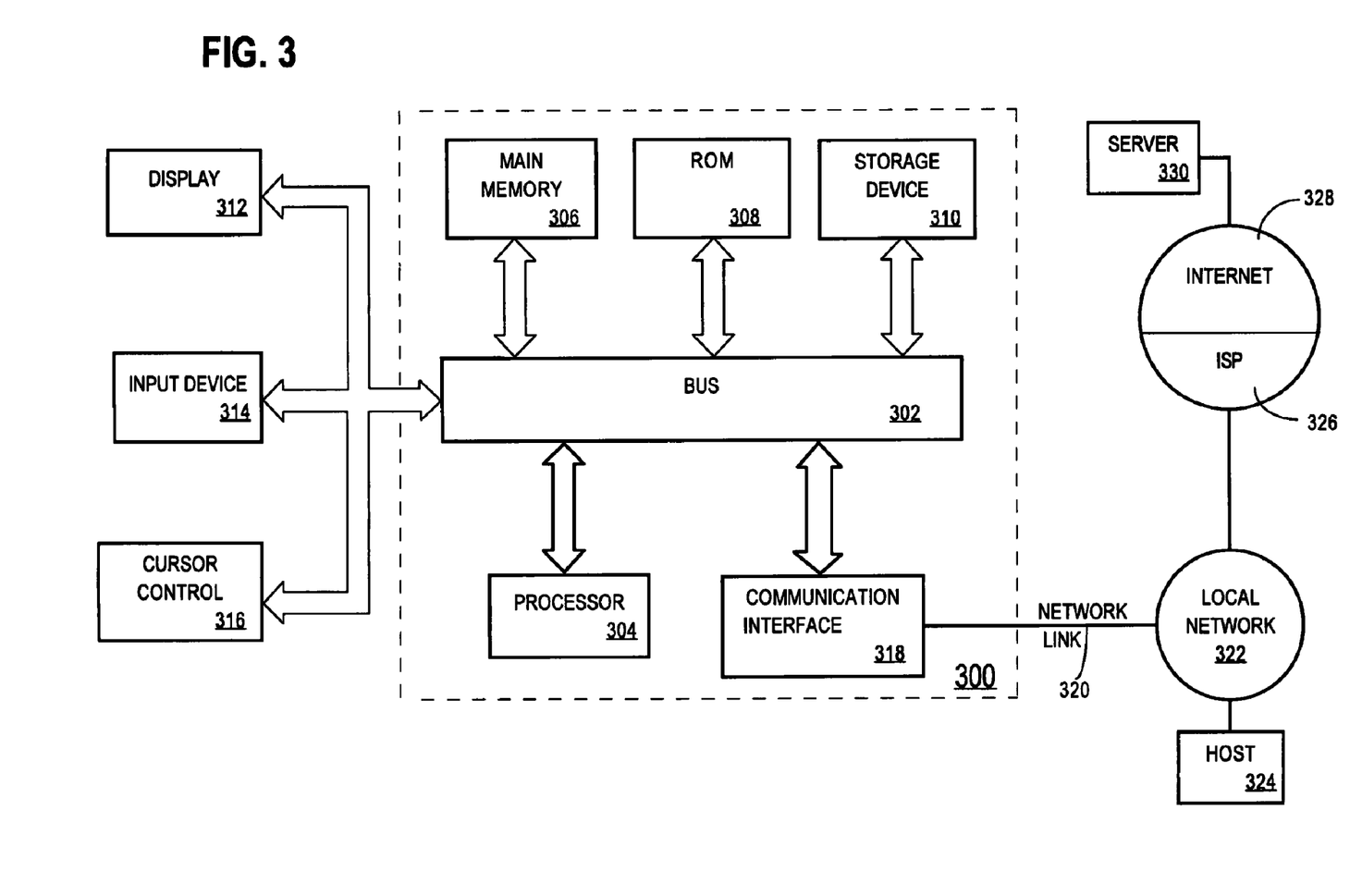
FIG. 3 is a block diagram illustrating a computer system that may be used in implementing an embodiment of the present invention.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to storage media and transmission media. Storage media includes both non-volatile media and volatile media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A method comprising:
    obtaining a threshold fragment size, wherein the threshold fragment size is computed based on at least one or more of a sequential write speed of a solid state drive (SSD) or a number of write operations that the SSD can perform in a particular period of time;
    determining whether a free space fragment on the SSD is smaller than the threshold fragment size;
    if the free space fragment on the SSD is smaller than the threshold fragment size, eliminating the free space fragment; and if the free space fragment on the SSD is not smaller than the threshold fragment size, retaining the free space fragment for storing data;

wherein the method is performed by one or more devices.

2. The method of claim 1, wherein the threshold fragment size is computed based on at least the sequential write speed of the SSD.

3. A computer-readable storage medium storing one or more sequences of instructions which, when executed by one or more processors, causes the one or more processors to perform the method recited in claim 2.

4. The method of claim 1, wherein the threshold fragment size is computed using one or more steps comprising dividing the sequential write speed of the SSD by the number of write operations that the SSD can perform in the particular period of time.

5. A computer-readable storage medium storing one or more sequences of instructions which, when executed by one or more processors, causes the one or more processors to perform the method recited in claim 4.

6. The method of claim 1, wherein eliminating the free space fragment comprises:
determining when utilisation of one or more resources required to eliminate the free space fragment complies with an idleness criteria; and
responsive to the utilization of the one or more resources complying with the idleness criteria, eliminating the free space fragment.

7. A computer-readable storage medium storing one or more sequences of instructions which, when executed by one or more processors, causes the one or more processors to perform the method recited in claim 6.

8. The method of claim 1, wherein eliminating the free space fragment comprises:
filling the free space fragment with at least a portion of a file.

9. The method of claim 8, wherein the file is one or more of:
a temporary filler file; or
a rarely used file.

10. A computer-readable storage medium storing one or more sequences of instructions which, when executed by one or more processors, causes the one or more processors to perform the method recited in claim 9.

11. A computer-readable storage medium storing one or more sequences of instructions which, when executed by one or more processors, causes the one or more processors to perform the method recited in claim 8.

12. The method of claim 1, wherein the threshold fragment size is computed based on at least the number of write operations that the SSD can perform in the particular period of time.

13. A computer-readable storage medium storing one or more sequences of instructions which, when executed by one or more processors, causes the one or more processors to perform the method recited in claim 12.

14. The method of claim 1, wherein the step of obtaining the threshold fragment size comprises performing at least one of:
(a) receiving the threshold fragment size, which was computed based on at least one or more of the sequential write speed of the SSD or the number of write operations that the SSD can perform in a particular period of time, from a user; or
(b) obtaining the threshold fragment size, which was computed based on at least one or more of the sequential write speed of the SSD or the number of write operations that the SSD can perform in a particular period of time, from a hard wired element within the SSD; or (c) the one or more devices computing the threshold fragment size at least by dividing the sequential write speed of the SSD by the number of write operations that the SSD can perform in the particular period of time; or
(d) the one or more devices determining the threshold fragment size by testing various values for the threshold fragment size that are higher or lower than an intermediate value obtained by dividing the sequential write speed of the SSD by the number of write operations that the SSD can perform in the particular period of time; and
selecting the threshold fragment size, from the various values for the threshold fragment size, which results in optimal performance.

15. A computer-readable storage medium storing one or more sequences of instructions which, when executed by one or more processors, causes the one or more processors to perform the method recited in claim 14.

16. A computer-readable storage medium storing one or more sequences of instructions which, when executed by one or more processors, causes the one or more processors to perform the method recited in claim 1.

17. A solid state drive (SSD) optimizer comprising:
means for obtaining a threshold fragment size, wherein the threshold fragment size is computed based on at least one or more of a sequential write speed of a solid state drive (SSD) or a number of write operations that the SSD can perform in a particular period of time;
means for determining whether a free space fragment on the SSD is smaller than the threshold fragment size;
means for eliminating the free space fragment if the free space fragment on the SSD is smaller than the threshold fragment size; and
means for retaining the free space fragment for storing data if the free space fragment on the SSD is not smaller than the threshold fragment size.

18. The SSD optimizer of claim 17, further comprising means for computing the threshold fragment size based on at least the sequential write speed of the SSD.

19. The SSD optimizer of claim 17, further comprising means for computing the threshold fragment size configured for at least dividing the sequential write speed of the SSD by the number of write operations that the SSD can perform in the particular period of time.

20. The SSD optimizer of claim 17, wherein the means for eliminating the free space fragment comprises:
means for determining when utilisation of one or more resources required to eliminate the free space fragment complies with an idleness criteria.

21. The SSD optimizer of claim 17, wherein the means for eliminating the free space fragment comprises:
means for filling the free space fragment with at least a portion of a file.

22. The SSD optimizer of claim 21, wherein the file is one or more of:
a temporary filler file; or
a rarely used file.

23. The SSD optimizer of claim 17, further comprising means for computing the threshold fragment size based on at least the number of write operations that the the SSD can perform in the particular period of time.

24. The SSD optimizer of claim 17, wherein the means for obtaining the threshold fragments size further comprising:
(a) means for receiving the threshold fragment size from a user; or
(b) means for obtaining the threshold fragment size from a hard wired element within the SSD; or (c) computing the threshold fragment size at least by dividing the sequential write speed of the SSD by the number of write operations that the SSD can perform in the particular period of time; or
(d) means for determining the threshold fragment size by testing various values for the threshold fragment size that are higher or lower than an intermediate value obtained by dividing the sequential write speed of the SSD by the number of write operations that the SSD can perform in the particular period of time; and
selecting the threshold fragment size, from the various values for the threshold fragment size, which results in optimal performance.

* * * * *